United States Patent
Lavery

(10) Patent No.: US 8,458,533 B2
(45) Date of Patent: Jun. 4, 2013

(54) WATCH DOG TIMER AND COUNTER WITH MULTIPLE TIMEOUT PERIODS

(75) Inventor: Kevin Patrick Lavery, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 307 days.

(21) Appl. No.: 12/939,085

(22) Filed: Nov. 3, 2010

(65) Prior Publication Data

US 2012/0110388 A1 May 3, 2012

(51) Int. Cl.
*G06F 11/00* (2006.01)

(52) U.S. Cl.
USPC .................................. 714/55; 714/11; 714/15

(58) Field of Classification Search
USPC ........................................................ 714/55
See application file for complete search history.

(56) References Cited

U.S. PATENT DOCUMENTS

| | | | | |
|---|---|---|---|---|
| 4,146,929 A | * | 3/1979 | Troughton et al. | 379/112.01 |
| 4,860,289 A | * | 8/1989 | Coulson | 714/15 |
| 4,956,842 A | * | 9/1990 | Said | 714/815 |
| 5,483,577 A | * | 1/1996 | Gulick | 379/88.07 |
| 5,491,787 A | * | 2/1996 | Hashemi | 714/11 |
| 6,957,368 B2 | * | 10/2005 | Neumiller et al. | 714/55 |
| 7,958,396 B2 | * | 6/2011 | Chitsaz et al. | 714/31 |
| 2002/0124212 A1 | * | 9/2002 | Nitschke et al. | 714/55 |
| 2007/0294601 A1 | * | 12/2007 | Chitsaz et al. | 714/55 |

OTHER PUBLICATIONS

"TMS470R1x System Module Reference Guide", SPNU189H, Texas Instruments Incorporated, Revised Nov. 2004, pp. 1-132.
Matthias Poppel, "Enhancing Automotive Safety with an IEC 61508 Compliant Processor Solution", Exhibitions & Congress, Nov. 13-15, 2007, Paris-Nord Villepinte Exhibition Centre, France, pp. 1-2.
Trevor Martin, "The Insider's Guide to the STM32 ARM Based Microcontroller, An Engineer's Introduction to the STM32 Series", Hitex Development Tools, Hitex (UK) Ltd., Coventry, United Kingdom, Apr. 21, 2008, pp. 1-96.

* cited by examiner

*Primary Examiner* — Kamini Patel
(74) *Attorney, Agent, or Firm* — Lawrence J. Bassuk; W. James Brady; Frederick J. Telecky, Jr.

(57) ABSTRACT

A time-out period is established for a watchdog timer. The time-out period is restarted each time a designated key value is received when each key value is received in a proper sequence. An error is indicated if set of key values is received in an incorrect sequence. A time-out is indicated if a correct sequence of key values is not received within the time-out period.

14 Claims, 5 Drawing Sheets

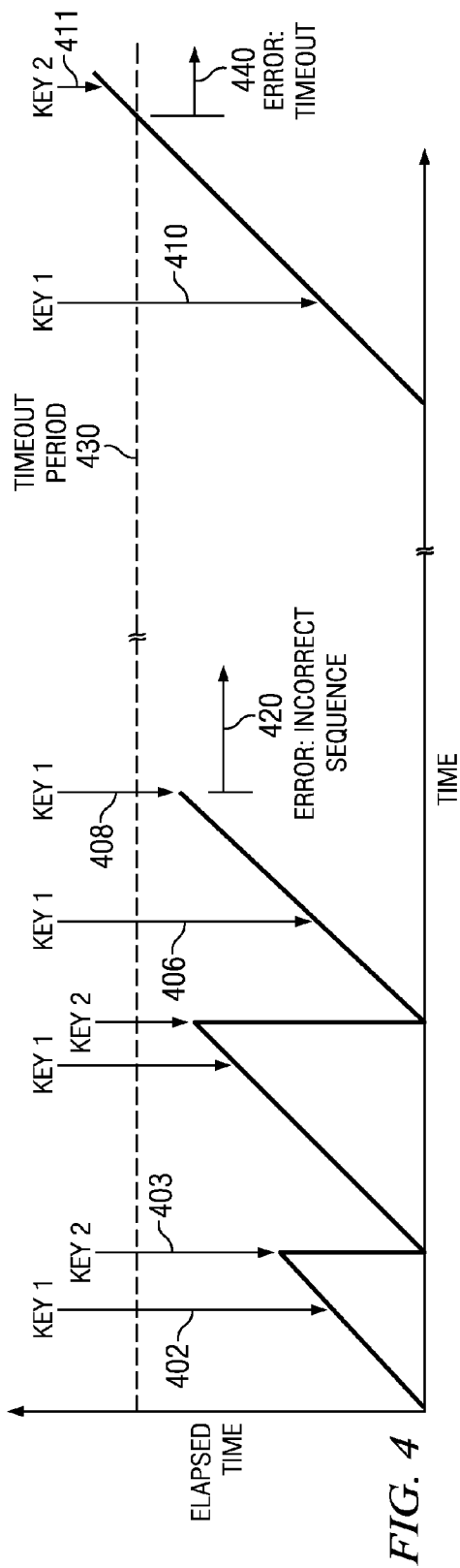
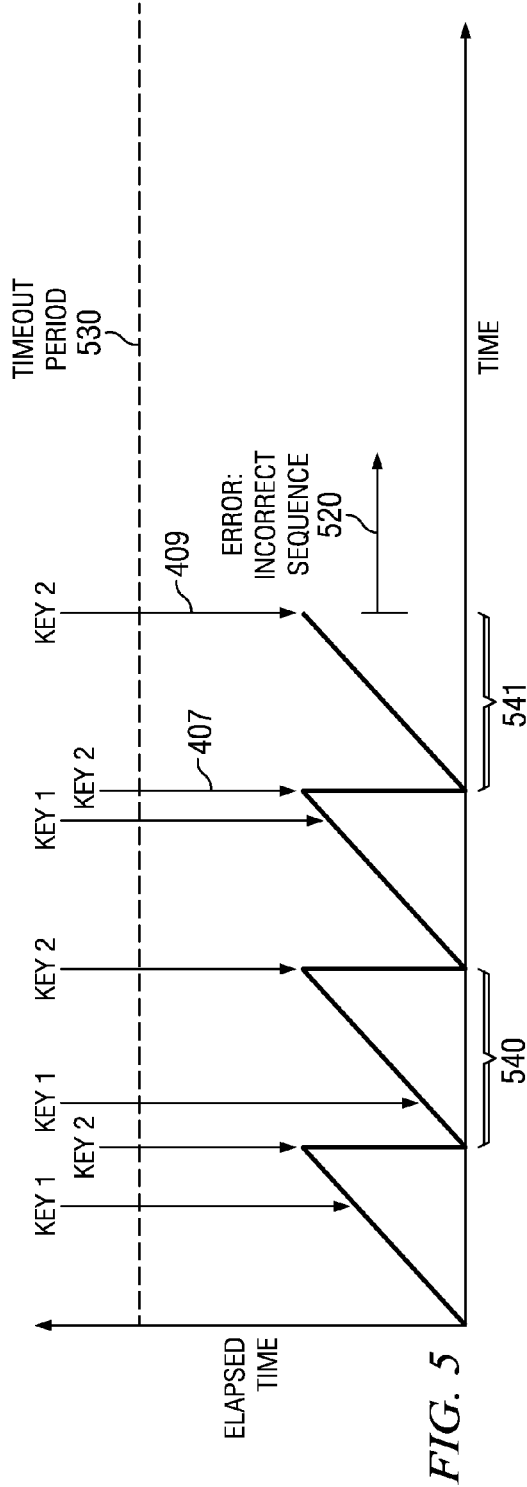
FIG. 4
FIG. 5

WATCH DOG TIMER AND COUNTER WITH MULTIPLE TIMEOUT PERIODS

FIELD OF THE INVENTION

This invention generally relates to microcontrollers and in particular to watchdog timers used by microcontrollers.

BACKGROUND OF THE INVENTION

Fault-tolerance or graceful degradation is a property that enables a computer based system to continue operating properly in the event of the failure of some aspect of the system operation. A failure detection mechanism is generally required to enable use of complex CPUs in safety critical systems, such as automotive, aerospace, industrial, medical, etc. For simple CPUs, this has traditionally been done by the use of online software based testing or by a full duplication of CPUs with a compare of all outputs, which is also known as "lockstep" CPUs. The second CPU is effectively a real time hardware checker. A watchdog timer may be used in conjunction with software based testing. When the watchdog timer is not reset by a software operation within a defined amount of time, an interrupt or reset operation is invoked to determine why the software did not respond correctly.

As the need for safety critical systems has expanded into embedded applications in automotive, aerospace, industrial, medical, etc., fault tolerant concepts are now employed within microcontroller units (MCUs) and/or microprocessor units (MPUs) that may be part of a system on a chip (SOC). These embedded systems may include one or more central processor units (CPU) that may execute application software for controlling the operation of an automobile, airplane, process control system or medical device, for example.

BRIEF DESCRIPTION OF THE DRAWINGS

Particular embodiments in accordance with the invention will now be described, by way of example only, and with reference to the accompanying drawings:

FIG. 3 is a block diagram of the watchdog timer of FIG. 1 and FIG. 2; and

FIGS. 4-9 are timelines illustrating operation of embodiments of the watchdog timer of FIG. 3.

DETAILED DESCRIPTION OF EMBODIMENTS OF THE INVENTION

Figure 1:
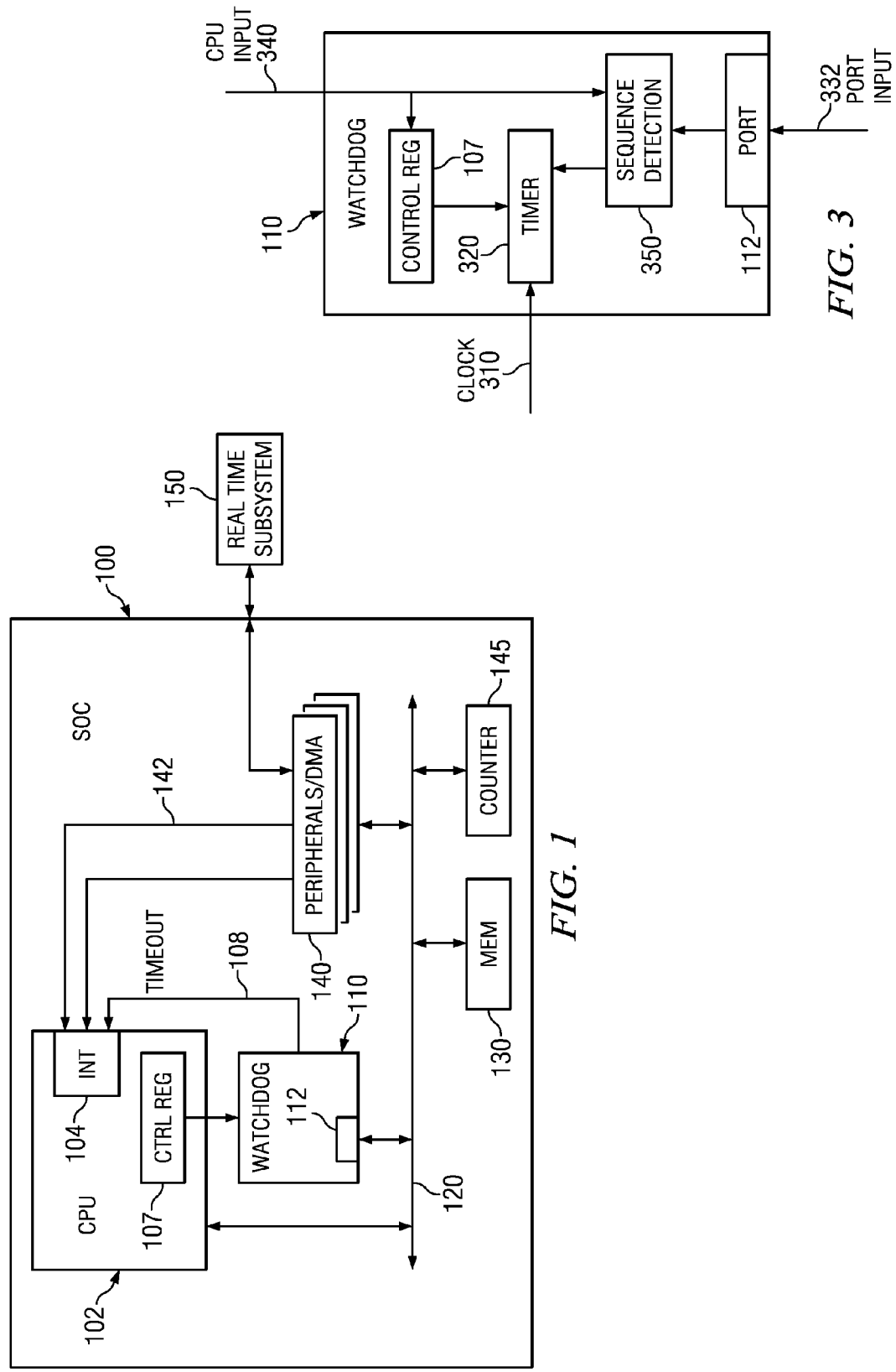
FIG. 1 is a block diagram illustrating an exemplary system on a chip (SOC) that includes a watchdog timer.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A typical watchdog function, such as one included in a Texas Instruments TMS470R1x System Module, checks that only two key words are written to the watchdog. If a different word is written to the watchdog, then the watchdog generates a reset. Additionally, if the correct sequence is not written in the timeout period, then the watchdog times out and generates a reset. However, if an incorrect sequence of key words is written during the timeout period the incorrect sequence is ignored.

In an embodiment of the present invention, a watchdog forces independent processes, processors, or fixed functional blocks to write specified key word values to the watchdog in a specific sequence order, insuring that these independent sequences occur in the correct order. If an incorrect sequence of key words is written to the watchdog, an interrupt is generated to indicate the occurrence of the incorrect sequence.

In this manner, a more robust system operation check is provided by enforcing not only the arrival of the correct two key words but also the sequence in which these two key words are written. Enforcing a sequence allows independent processes to write the different keys and allows the watchdog to determine if the processes occurred in the correct sequence. For example, by providing a port to the watchdog so that multiple independent masters may write one of the key values allows distributed sequencing in which a CPU sets the watchdog and a peripheral or a different CPU independently clears it.

The International Electrotechnical Commission (IEC) 61508 SIL3 standard, "Functional Safety of Electrical/Electronic/Programmable Electronic Safety-Related Systems" defines a level of safety that is designated for automotive applications. The IEC 61508 standard classifies two types of watchdog functions: a temporal watchdog that relies on time alone and logical monitoring that requires a correct key combination. Embodiments of the present invention add an additional level of safety detection by enforcing not only the arrival of the correct two key words but also the sequence in which these two key words are written.

The sequence checking generates an interrupt if either of the two key words occurs twice without an intermediate write of the opposing key word. In other embodiments of the invention, the watchdog may be configured to generate a reset or an abort operation instead of an interrupt. This sequencing generates a finer time window into which the opposing key word must be written. That is, the watchdog default timeout period is fixed but the granularity may be increased through software.

Verification of the sequence in which keys are written into the watchdog offers several benefits. The watchdog timeout value can be generated on a relatively long boundary because the sequence checking offers a finer timeout period. This long boundary for the default timeout allows the clock source for the watchdog to be fixed. For a safety system, it may be desirable that the watchdog clock source be independent of the operating clock source for the device, for example, an internal low power oscillator.

A finer period for the watchdog timer may provide a "windowed watchdog" in which each tick sets a window for the other independent processor. The alternating windowing of different independent processes may be used to ensure that the independent processes stay in lock step. The windowing of independent processes also may allow each of the processes to monitor the other.

The addition of a port allows fixed logical blocks such as peripheral devices to drive the watchdog without a risk that they might inadvertently disable the functionality of the watchdog. The port allows for verification that distributed resources maintain lock-step.

In another embodiment of the invention, an external peripheral, such as a timer, may be used to generate a watchdog reset based upon the period of a selected or designated peripheral device, as will be described in more detail below.

This watchdog functionality is useful in an embodiment of the invention with a multi-processor system using a hardware semaphore, as will be described in more detail below.

FIG. 1 is a block diagram illustrating an exemplary system on a chip (SOC) 100 with CPU 102 coupled to watchdog circuit 110. For purposes of this disclosure, the somewhat generic term "microcontroller" (MCU) is used to apply to any complex digital system on a chip (SOC) that may include one or more processing modules 102, memory 130, and peripherals and/or DMA (direct memory access) controllers 140. At least a portion of memory module 130 may be non-volatile and hold instruction programs that are executed by processing module(s) 102 to perform the system applications. CPU 102 is coupled to system bus 120 for access to bulk memory 130. Peripherals 140 are also coupled to system bus 120 to allow access and control by CPU 102.

The topology and configuration of SOC 100 is strictly intended as an example. Other embodiments of the invention may involve various configurations of buses for interconnecting various combinations of memory modules, various combinations of peripheral modules, multiple processors, etc. In some embodiments, CPU 102 may have a direct connection to the system bus, while in other embodiments the CPU may access the system bus via a path through a cache or other type of memory buffer, for example.

CPU 102 may be any one of the various types of microprocessors or microcontrollers that are now known or later developed. For example, CPU 102 may be a digital signal processor, a conventional processor, or a reduced instruction set processor. As used herein, the term "microprocessor" or CPU is intended to refer to any processor that may be included within a system on a chip.

SOC 100 is coupled to real time subsystem (RTS) 150. RTS 150 may be a motor, for example, in which case SOC 100 controls motor speed and direction by controlling the application of voltage to multiple sets of stator windings based on rotor position. In another example, RTS 150 may be a speaker for playing audio sound or music that is converted from a digital stream by SOC 100. For the purpose of the description herein, RTS 150 is any type of device or component now known or later developed that requires some form of hard real-time control.

One or more of the peripheral devices 140 may provide control signals or data signals to RTS 150 and may receive status or other information from RTS 150. For example, if RTS 150 is a motor, peripheral device 140 may receive rotor position data from RTS 150 that generates an interrupt for a new stator control setting. As another example, if RTS 150 is a speaker, peripheral device 140 may provide an analog sound signal to RTS 150. Another peripheral module may be accessing a digital stream of audio data and generate an interrupt when a new frame of audio data is available. SOC 100 may be part of a mobile handset and be receiving voice and music digital signals via a cellular telephone network, for example.

In this embodiment of the invention, a control register 107 is provided which provides an interface for watchdog 110 to CPU 102. Control register 107 and watchdog 110 may be a module located within CPU 102. In another embodiment, control register 107 and watchdog 110 may be a separate module from CPU 102 that is controllably coupled to CPU 102.

A port 112 in watchdog 110 is coupled to bus 120 to allow masters on bus 120 to write key values into watchdog 110. Port 112 is configured to receive write transaction from bus 120 by responding to a memory mapped address assigned to watchdog 110. In some embodiments, CPU 102 may write key values into watchdog 110 via control registers 107. In another embodiment, CPU 102 may write key values into watchdog 110 via port 112 as a memory mapped access on bus 120. In this manner, CPU 102 and one or other masters on bus 120, such as one or more of peripherals 140, may write key values into watchdog 110.

For the present embodiment, the knowledge that an interrupt service routine is being requested is provided by interrupt controller 104 that is part of CPU 102. Interrupt controller 104 receives one or more interrupt signals 142 from various sources, such as peripheral devices 140, timers, or other modules (not shown) within SOC 100. Watchdog 110 may assert interrupt signal 108 to indicate when a timeout or sequence error is detected by watchdog 110. In some embodiments, there may be two separate interrupt signals 108 to distinguish between a timeout of watchdog 110 and detection of an incorrect sequence. In some embodiments, there may be a single interrupt and one or more status bits may be set by watchdog 110 in register 107, for example, to indicate why the interrupt signal is asserted. In another embodiment, watchdog 110 may assert a reset signal that causes CPU 102 or some other part of SOC to be reset when a timeout or an improper sequence is detected.

Figure 2:
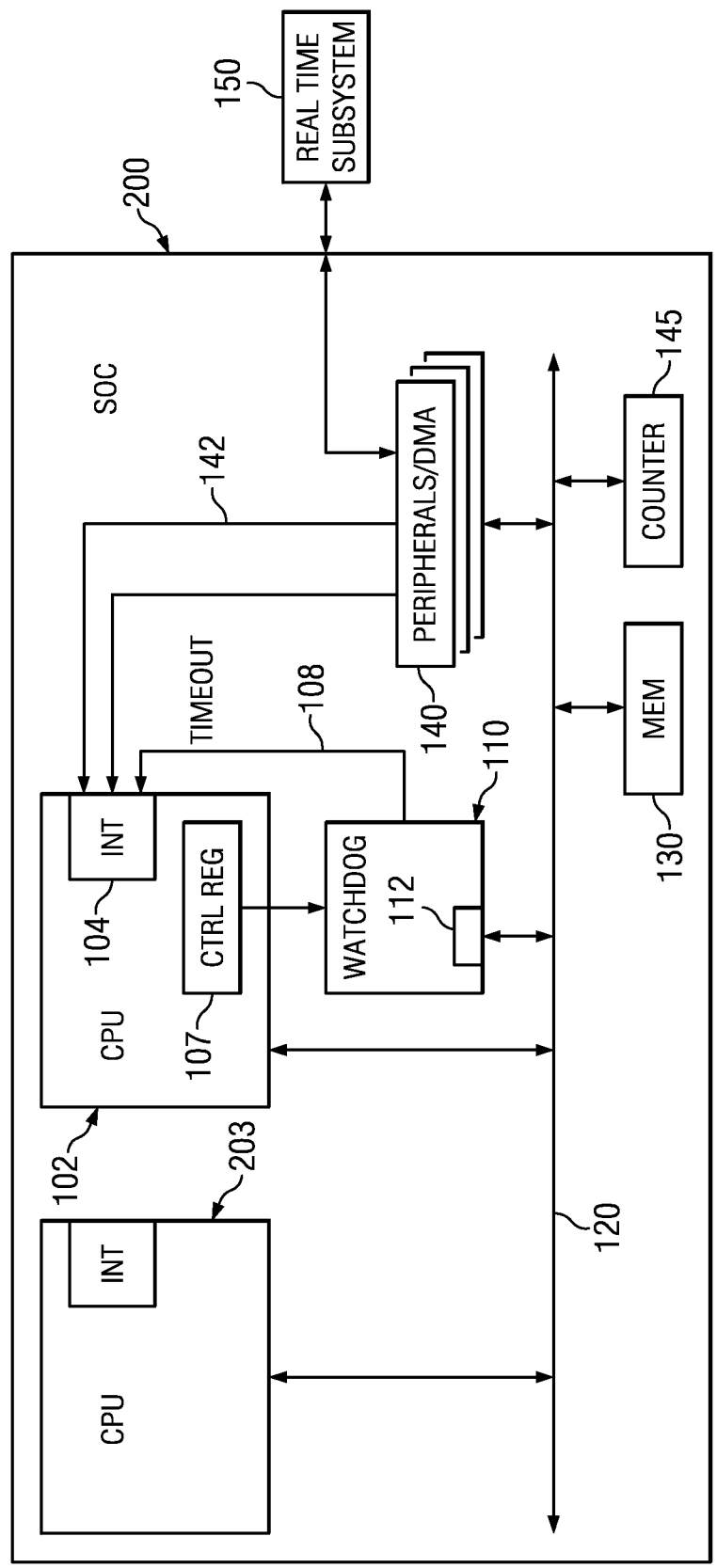
FIG. 2 is a block diagram illustrating an exemplary SOC that includes a watchdog timer and multiple CPUs.

FIG. 2 is a block diagram illustrating an exemplary system SOC 200 that includes a watchdog timer and multiple CPUs. In this embodiment, CPU 102 and CPU 203 both execute application programs that control real time subsystem 150. Both CPUs may access and write key values to watchdog 110 as described with respect to FIG. 1. This watchdog functionality is useful in an embodiment of the invention with a multi-processor system using a hardware semaphore. In this case, the watchdog alerts a dispatcher on CPU 102 via interrupt signal 108 that the distributed resources have not completed the processing within the time-frame allotted by the dispatcher. The watchdog generates a hardware exception which allows the dispatcher to re-gain control of the system and clear a blocked process through software intervention.

Port 112 may receive key values written by CPU 203 and/or other masters coupled to bus 120, such as one or more of peripherals 140. Writing to the watchdog may be controlled by a configurable number of distributed resources through simple glue logic. All of the selected distributed resources must assert their semaphore before the watchdog is updated or else an error will be generated by watchdog 110.

FIG. 3 is a block diagram of watchdog timer 110. Port 112 is configured to receive key values from port input 332 that is typically coupled to a memory bus, such as bus 120 of FIG. 1 and FIG. 2. Control registers 107 may be included within the watchdog module 110, or may be implemented as part of a CPU or other system module, such as control registers 107 of FIG. 1. In either case, the control registers may be configured to turn the watchdog on and off, and to define the timeout period in response to register accesses on CPU input bus 340. In some embodiments, the CPU input bus 340 may also be configured to allow a CPU to write key values to watchdog 110 as register writes, as discussed above with respect to FIG. 1.

Timer 320 is a resettable timing circuit that may be configured by control registers 107 to define a timeout period. In this embodiment, timer 320 is a digital timer that counts down from a value specified by control registers 107 in response to clock signal 310. Clock signal 310 may be a same clock that is used by CPU 102, or a divided down version of it. It some embodiments, clock signal 310 may be derived from a separate oscillator in order to provide an additional measure of failure detection in case the main clock signal is compromised. In another embodiment, timer 320 may be an analog timer in which the timeout period is determined by timing components such as a resistor-capacitor pair.

Sequence detection logic 350 is configured to detect the sequence in which key values are received by watchdog 110. In some embodiments, sequence detection logic 350 may receive key values from CPU input 340 as register writes and from port 112 as memory mapped writes. In other embodiments, key values are received only via port 112. When the key values are received in a correct sequence, sequence detection logic 350 causes timer circuit 320 to reset. When the key values are received in an incorrect sequence, sequence detection logic 350 indicates an error. In various embodiments, an error may be indicated by asserting a reset signal, asserting an interrupt signal, asserting an abort signal, etc. When a correct sequence of key values is not received within a timeout period, timer 320 indicates a timeout. In various embodiments, a timeout may be indicated by asserting a reset signal, asserting an interrupt signal, asserting an abort signal, etc One or more status bits in control registers 107 may be set by sequence detection logic 350 and timer 320 to indicate the reason for asserting an interrupt/reset/abort signal.

FIGS. 4-9 are timelines illustrating operation of embodiments of the watchdog timer of FIG. 3. In some embodiments, the timer will be configured to be restarted after a given sequence of two or more key values is received in a correct sequence, as illustrated by FIG. 4. In the embodiment of FIG. 4, a sequence of two key values must be received, and the correct sequence is an alternating sequence. For example, key value 1 may be a hex value of 0x0A3 and key value two may be a hex value of 0x0E5. Key value 1 (402) is received followed by key value 2 (403). Key value 1 must then follow key value 2. As long as the correct sequence is received, timer 320 will be restarted each time key value 2 is received. Thus, in this embodiment, key value 2 is designated as the key value that causes the timer to be restarted.

If an incorrect sequence is received, then an error 420 will be indicated by sequence detection logic 350. For example, key value 1 (406) is received and then key value 1 (408) is received. Since key value 2 was not received between key value 1 (406) and key value 1 (408), this is an incorrect sequence.

If a correct sequence key 1 (410) key 2 (411) is received, but key value 2 (411) is not received prior to exceeding timeout period 430, then a timeout error 440 is indicated by timer 320.

FIG. 5 is a timeline illustrating using watchdog 110 as a windowed watchdog. In this case, another timing circuit such as counter 145 in FIG. 1 is used to establish a window by periodically writing key value 2 to watchdog 110. Counter 145 may be configured by software to establish a window period 540 that is much finer than timeout period 530. Each time counter 145 counts down and restarts it writes key value 2 to watchdog 110 via port 112. As long as key value 1 is received within the window established by counter 145, operation proceeds. However, if at anytime key value 1 is not received in a window, such as window 541 defined by key 2 (407) and key 2 (409), an incorrect sequence error 520 is indicated by detection logic 350.

Figure 6:
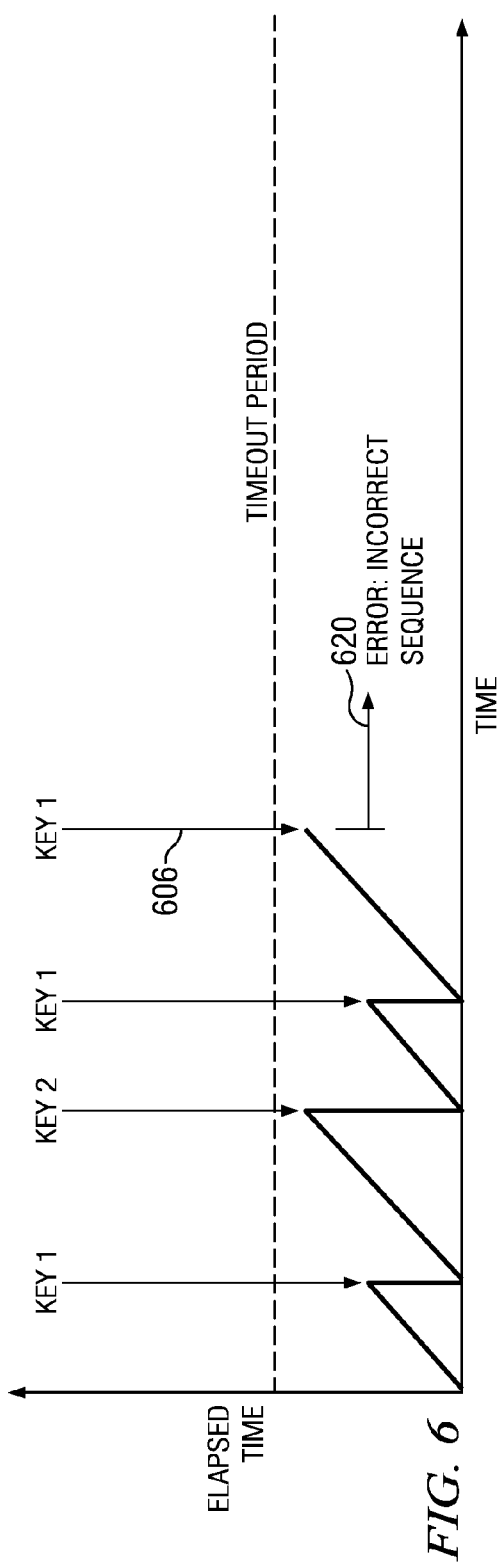

FIG. 6 is a timeline illustrating another embodiment in which timer 320 may be configured to restart each time any of two or more key values is received in a correct sequence. In this embodiment, timer 320 is restarted each time either of key value 1 or key value 2 is received. However, if detection logic 350 detects an incorrect sequence such as key value 1 (606), an incorrect sequence error 620 is indicated by detection logic 350. Thus, in this embodiment each key value of the set of key values is designated to cause the timer to be restarted.

Figure 7:
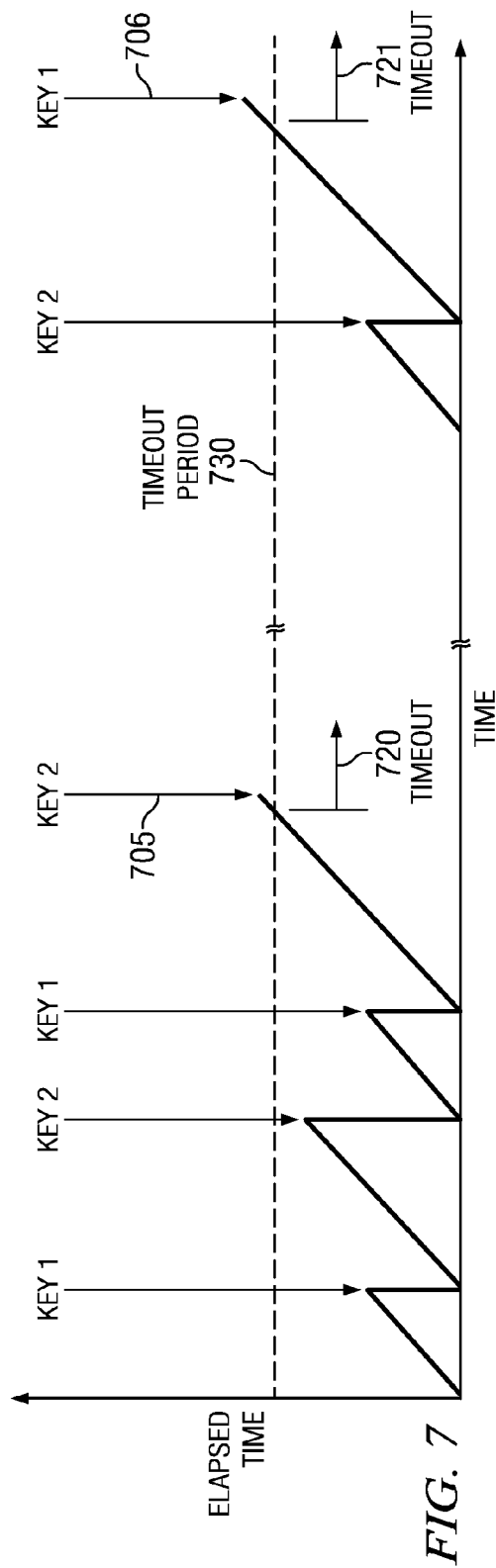

FIG. 7 is a timeline illustrating a timeout for the embodiment illustrated by FIG. 6. Whenever a key value 2, such as key value 2 (705) is not received prior to timeout period 730, timer 320 indicates a timeout error 720. Similarly, whenever a key value 1, such as key value 1 (706) is not received prior to timeout period 730, timer 320 indicates a timeout error 721.

Figure 8:
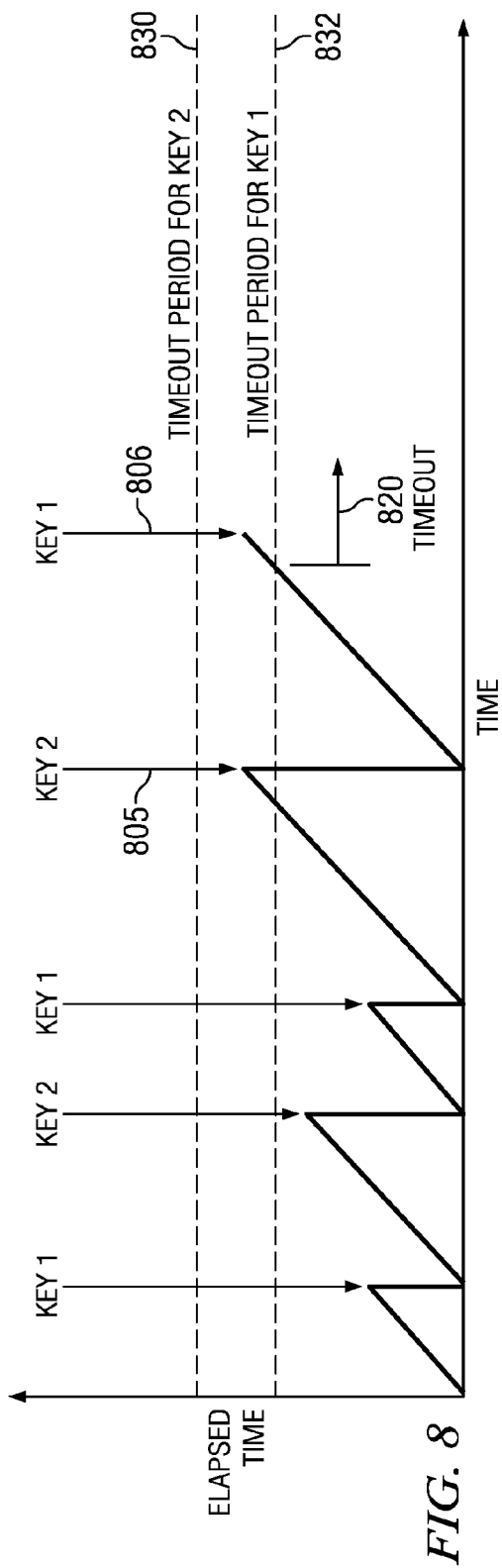

FIG. 8 is a timeline illustrating another embodiment in which timer 320 may be configured to restart to a timeout value having one value in response to receiving one key value, and to restart to another timeout value in response to receiving another key value. For example, in this embodiment each time key value 1 is received, timer 320 is configured to define timeout period 830 for key value 2, and each time key value 2 is received timer 320 is configure to define timeout period 832 for key value 1. The relationship of timeout period 830 and timeout period 832 is illustrative and may vary under control of configuration registers 107.

In this embodiment, key value 2 (805) may be received later than the timeout period for key value 1, as long as it is received prior to the timeout period for key value 2. However, if key value 1 (806) is received after the timeout period 832 for key value 1, timer 320 will indicate a timeout error 820. Similarly, if key value 2 is received after the timeout period 830 for key value 2, a timeout error would be indicated.

Figure 9:
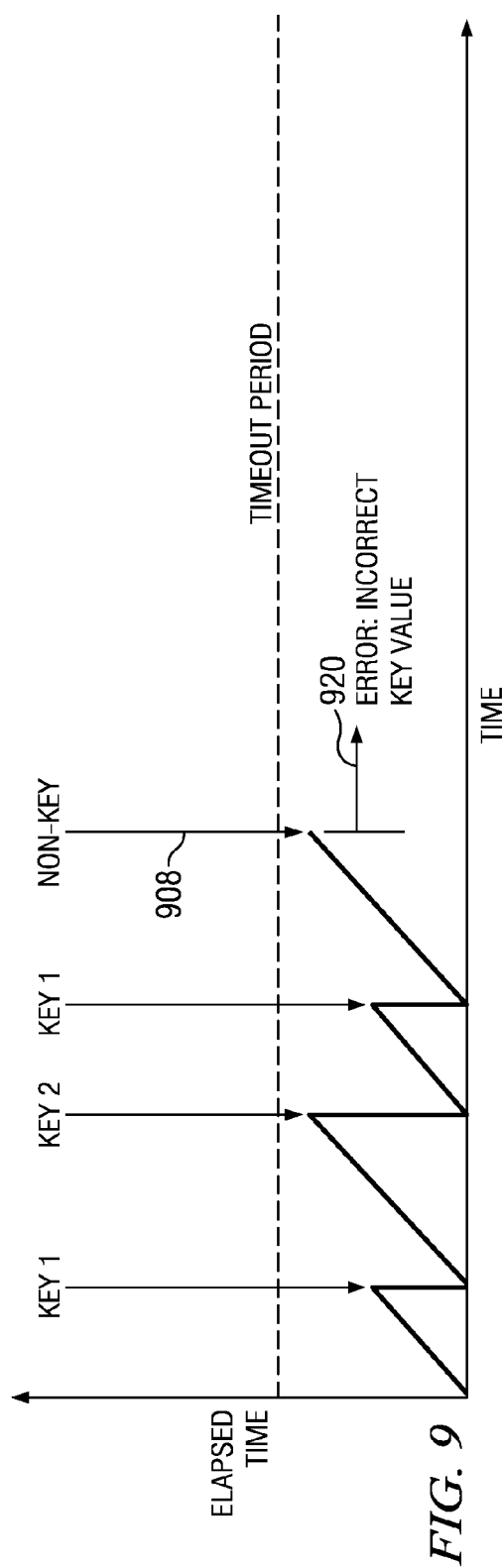

FIG. 9 illustrates another aspect of the operation of the watchdog timer of FIG. 3. Whenever a value is received by sequence detection logic 350 that is not part of a defined set of key values, such as non-key value (908), an incorrect key value error 920 will be indicated by sequence detection logic 350. This may be indicated using a same interrupt signal as used for an incorrect sequence error. It may be distinguished by a status bit in control register 107. In another embodiment, a separate interrupt signal may be used to indicate this error.

Other Embodiments

While the invention has been described with reference to illustrative embodiments, this description is not intended to be construed in a limiting sense. Various other embodiments of the invention will be apparent to persons skilled in the art upon reference to this description. For example, the watchdog timer may be implemented as a digital or as an analog timer.

In another embodiment, more than two key values may be defined to allow more than two processes or masters to be checked. In some embodiments, a correct sequence will require each and every one of the key values to be received in a specified order. In another embodiment, there may be a few key values that must be received in specified order, and additional values that may be received in any order, as long as all values are received prior to restarting that sequence.

Although the invention finds particular application to microcontrollers implemented, for example, as a SOC, it may also be included in an Application Specific Integrated Circuit (ASIC). An SOC or an ASIC may contain one or more megacells which each include custom designed functional circuits combined with pre-designed functional circuits provided by a design library.

Embodiments of the watchdog timer and methods described herein may be provided on any of several types of digital systems, such as: digital signal processors (DSPs), general purpose programmable processors, application specific circuits, or systems on a chip (SoC) that may include combinations of a DSP and a reduced instruction set (RISC) processor together with various specialized accelerators, for example.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method of operating a watchdog timer, the method comprising:
   establishing a timeout period;
   restarting the timeout period after the receipt of a designated key value of a set of key values when each key value of the set of key values is received in a correct sequence;
   indicating a sequence error when the set of key values is received in an incorrect sequence; and
   indicating a timeout when the correct sequence of key values is not received within the timeout period;
   the establishing a timeout period including establishing a different timeout period for each key value of the set of key values.

2. The method of claim 1, wherein the set of key values includes only two values.

3. The method of claim 1, wherein the set of key values comprises more than two values.

4. The method of claim 1, including: receiving a first one of the set of key values from a first master; and receiving a second one of the set of key values from a different second master.

5. The method of claim 4, wherein the second master is a peripheral device.

6. The method of claim 1, including generating an interrupt in response to a time-out.

7. The method of claim 6, including generating a different interrupt in response to a sequence error.

8. The method of claim 1, wherein more than one key value of the set of key values is designated to restart the timeout period.

9. The method of claim 1, including establishing a timing window by providing the designated key value in a periodic manner.

10. An integrated circuit system, comprising:
    a watchdog timer, wherein the watchdog timer includes a restartable timing circuit configured to define a timeout period;
    a port for receiving key values;
    a sequence detection logic coupled to the timing circuit, wherein the sequence detecting logic is configured to restart the timing circuit after receipt of a designated key value of a set of key values when each key value of the set of key values is received in a correct sequence, indicate a sequence error when the set of key values is received in an incorrect sequence, and indicate a timeout when the correct sequence of key values is not received within the time-out period; and
    a counter coupled to the port, the counter being configured to provide a designated key value at a periodic rate, wherein the periodic rate establishes a timing window that is shorter than the timeout period.

11. The system of claim 10, including at least two devices coupled to the sequence detection logic, wherein each device is configured to provide a different one of the set of key values to the sequence detection logic.

12. The system of claim 10, including at least two CPUs coupled to the watchdog timer, wherein each of the at least two CPUs is configured to provide one or more key values of the set of key values.

13. The system of claim 11, wherein at least one of the devices is a peripheral device.

14. The system of claim 13, including a real time subsystem coupled to the peripheral device.

* * * * *